(12) United States Patent
Krieger

(10) Patent No.: US 7,506,719 B2
(45) Date of Patent: Mar. 24, 2009

(54) SELF-SYNCHRONIZING HYDRAULIC SYSTEM

(75) Inventor: Daniel J. Krieger, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 11/087,338

(22) Filed: Mar. 23, 2005

(65) Prior Publication Data
US 2006/0213715 A1 Sep. 28, 2006

(51) Int. Cl.
*B62D 5/06* (2006.01)
(52) U.S. Cl. .................. 180/414; 180/434; 180/439; 180/442; 180/441; 90/520; 90/536
(58) Field of Classification Search ............. 180/414, 180/434, 439, 442, 441; 90/520, 536
See application file for complete search history.

(56) References Cited

U.S. PATENT DOCUMENTS

| | | | | |
|---|---|---|---|---|
| 2,462,580 A | 2/1949 | Watson | | 121/41 |
| 2,783,849 A | 3/1957 | Armington et al. | | 180/79.2 |
| 3,502,002 A | 3/1970 | Whiteman, Jr. | | |
| 3,502,202 A | 3/1970 | Whiteman, Jr. | | 91/178 |
| 3,583,282 A | 6/1971 | Cope | | 91/25 |
| 3,627,053 A | 12/1971 | Hook et al. | | 172/9 |
| 3,856,102 A * | 12/1974 | Queen | | 180/414 |
| 3,916,624 A * | 11/1975 | Machens et al. | | 60/394 |
| 4,164,122 A | 8/1979 | Ward | | 60/547 |
| 4,241,641 A * | 12/1980 | Reinert | | 91/189 A |
| 4,354,688 A * | 10/1982 | Swanson | | 280/43.23 |
| 4,655,031 A | 4/1987 | Kucera | | 56/11.9 |

(Continued)

FOREIGN PATENT DOCUMENTS

EP   1 006 075 A1   6/2000

(Continued)

OTHER PUBLICATIONS

International Search Report for Application No. PCT/US2006/010603, filed Mar. 23, 2006. Date of Mailing: Jul. 24, 2006.

*Primary Examiner*—Paul N Dickson
*Assistant Examiner*—Marlon A Arce
(74) *Attorney, Agent, or Firm*—John D. Veldhuis-Kroeze; Westman, Champlin & Kelly, P.A.

(57) ABSTRACT

A fluid system is described, which comprises first and second cylinders, each of which comprises a piston, and a first end and a second end corresponding to full stroke positions of the corresponding piston. The first ends and second ends of the two cylinders thereby define four cylinder ends. The first and second cylinders are fluidly coupled to each other via a first matched pair of cylinder ends selected from the first ends or the second ends. The system includes first and second bypass devices. The bypass devices are each configured so that when a full stroke position is occupied at a respective bypass end from among the four cylinder ends by the corresponding piston, the respective bypass device opens an outlet that allows a flow from the respective cylinder to bypass to a conduit coupled to the respective bypass end. This allows for the two cylinders to self-correct any tendency to lose synchronization with each other, and allows the system to balance pressure between the two cylinders.

21 Claims, 5 Drawing Sheets

U.S. PATENT DOCUMENTS

| | | | | |
|---|---|---|---|---|
| 4,738,315 A | * | 4/1988 | Kinzenbaw | 172/310 |
| 4,976,336 A | * | 12/1990 | Curran | 187/208 |
| 4,986,393 A | * | 1/1991 | Preukschat et al. | 188/266.6 |
| 5,092,419 A | * | 3/1992 | Leiber et al. | 180/414 |
| 5,427,182 A | | 6/1995 | Winter | 172/2 |
| 5,573,366 A | | 11/1996 | Meijer | 414/664 |
| 6,000,315 A | * | 12/1999 | Graham et al. | 91/520 |
| 6,050,430 A | | 4/2000 | Fleagle et al. | 212/278 |
| 6,408,977 B1 | * | 6/2002 | Obertrifter et al. | 180/442 |
| 6,550,566 B1 | * | 4/2003 | Engelbrecht | 180/432 |
| 6,655,492 B2 | * | 12/2003 | Juul et al. | 180/419 |
| 2001/0004032 A1 | * | 6/2001 | Zenker et al. | 180/442 |

FOREIGN PATENT DOCUMENTS

GB        517314        3/1938

* cited by examiner

SELF-SYNCHRONIZING HYDRAULIC SYSTEM

BACKGROUND OF THE INVENTION

The present invention relates to a fluid system, and particularly to a self-synchronizing hydraulic system.

Hydraulic systems with pressurized flow to multiple cylinders have traditionally provided important solutions to a variety of applications. As one example, the steering systems for a variety of vehicles have traditionally often involved a hydraulic system wherein the extension and retraction of a hydraulic cylinder drives the steering of the vehicle's wheels or other components involved in steering. In such a system, in the case of a single-rod cylinder, pressurized flow is supplied alternately to the base end or the rod end of a cylinder, causing the cylinder's piston to extend or retract, thereby controlling the steering component. Similarly, in the case of a double-rod cylinder, pressurized flow is supplied alternately to the first end or the second end of a cylinder, causing the cylinder's piston to extend one way or extend the other way, thereby controlling the steering component.

For example, some systems include multiple cylinders that are operated together, but with independent control of individual cylinders, such as through a selector valve. In such a system, there has traditionally been an undesirable effect in which the cylinders become unsynchronized, wherein the extension or retraction position of one cylinder's piston is offset from the position of another cylinder's piston. One way in which this undesirable effect has traditionally been addressed is by providing the steering selector valve with multiple steering modes and the cylinders with position sensors, allowing an operator to refer to the position sensors to synchronize the cylinders manually by redirecting flow to the appropriate side. However, there has been an unmet need in some applications for an alternative to this traditional solution.

SUMMARY OF THE INVENTION

The present invention provides an efficient and effective solution to the problems discussed above, among other advantages and benefits.

A hydraulic system is described, which comprises first and second cylinders, each of which comprises a piston, as well as a first end and a second end. The first end and second end correspond to full stroke positions of the corresponding piston. The first ends and second ends of the two cylinders thereby define four cylinder ends among the two cylinders. The first and second cylinders are fluidly coupled to each other via a first matched pair of cylinder ends consisting of either the first ends or the second ends. The system includes first and second bypass devices. The bypass devices are each configured so that when a full stroke position is occupied at a respective bypass end from among the four cylinder ends by the corresponding piston, the respective bypass device opens an outlet that allows a flow from the respective cylinder to bypass the corresponding piston to a conduit coupled to the respective bypass end. This allows for the two cylinders to self-correct any tendency to lose synchronization with each other, and allows the system to balance volume between the two cylinders. This is useful for a wide variety of applications, such as, for example, a four-wheel-steering vehicle in which each of the two cylinders controls the steering for each of two pairs of wheels on the vehicle. Additional embodiments and benefits will be perceived by those skilled in the relevant art from the specification, figures and claims herein.

DETAILED DESCRIPTION OF PREFERRED EMBODIMENTS

Figure 1:
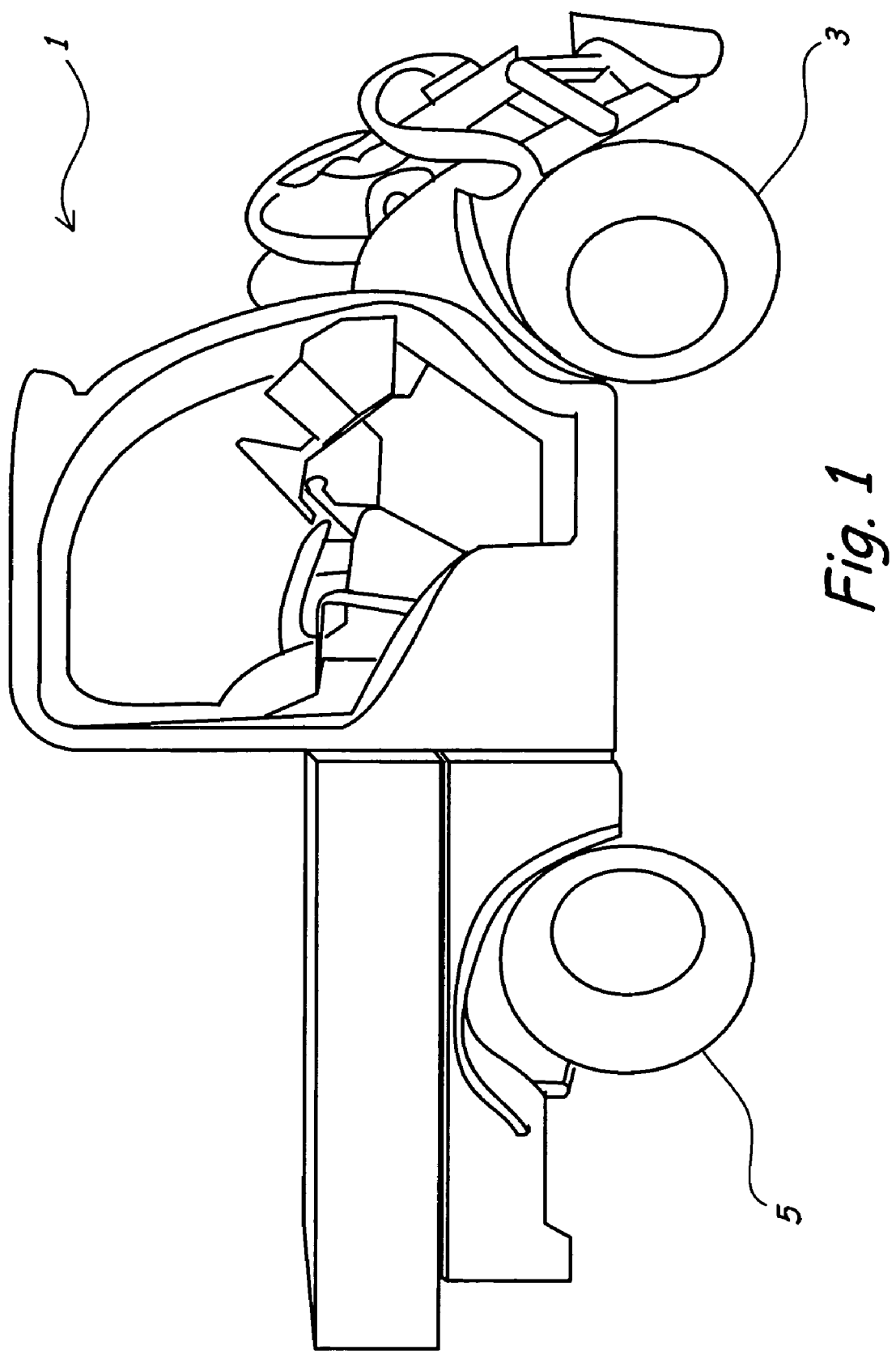
FIG. 1 is a depiction of a wheeled vehicle incorporating a hydraulic system according to one embodiment of the present invention.

FIG. 1 depicts a four-wheel-steering vehicle 1 including a hydraulic system of the present invention. Vehicle 1 includes a pair of front steering wheels, one of which is visible as wheel 3, which are controlled by a front steering cylinder. A pair of rear steering wheels, one of which is visible as wheel 5, are controlled by a rear steering cylinder. To steer vehicle 1 to the left, the front wheels would be turned to the left and the rear wheels would be turned to the right, and vice versa; to steer vehicle 1 to the right, the front wheels would be turned to the right and the rear wheels would be turned to the left. This provides the four-wheel-steering vehicle with a tighter turn radius and other advantages over an otherwise similar vehicle with steering in either the front wheels alone or the rear wheels alone. Four-wheel-steering vehicle 1 is one illustrative application among a wide variety of applications in which the present invention may be usefully and beneficially included.

Figure 2:
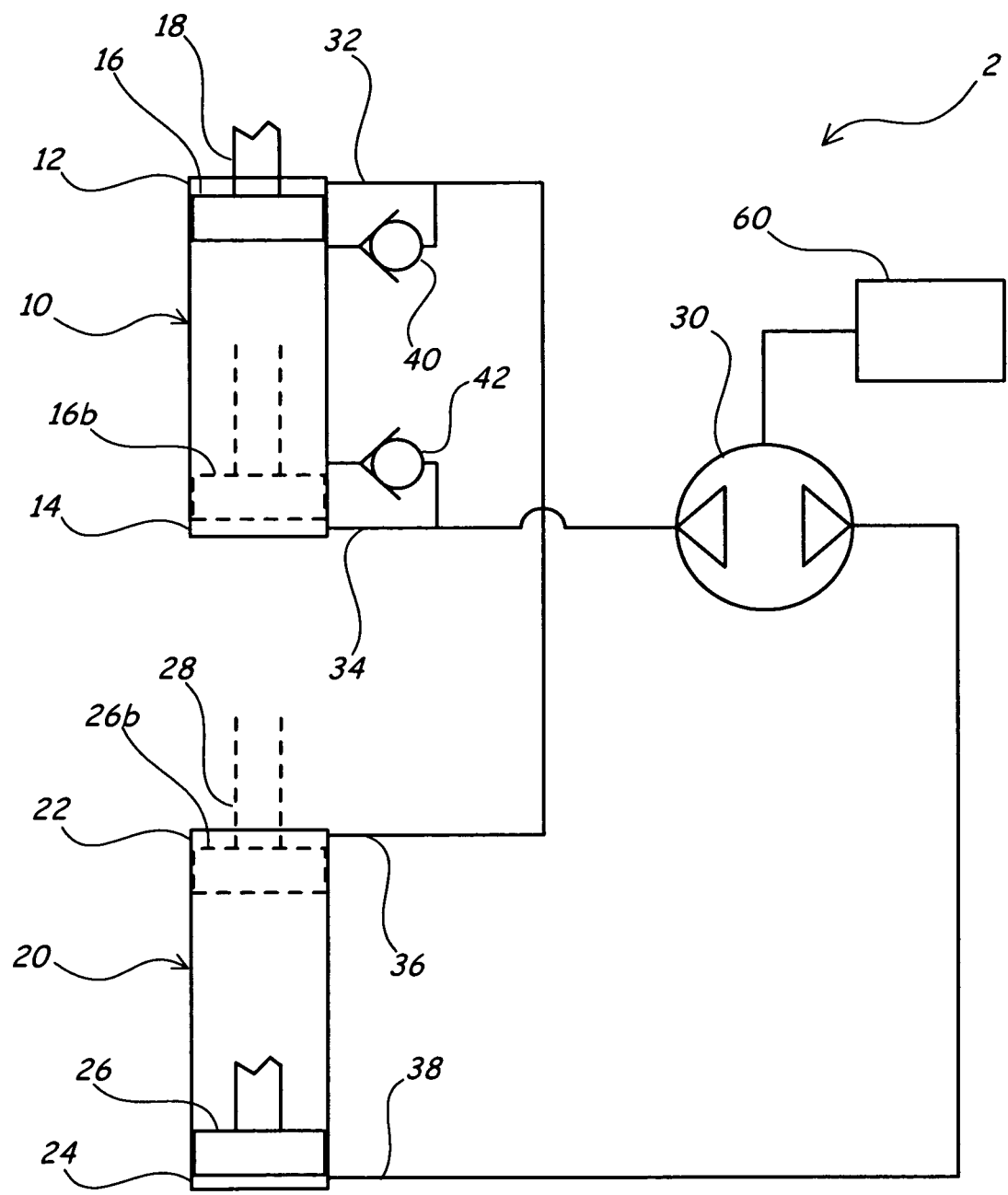
FIG. 2 is a schematic depiction of a hydraulic system according to a second embodiment of the present invention.

FIG. 2 depicts a hydraulic system 2 of the present invention, in an illustrative embodiment of a fluid system that could usefully be incorporated in four-wheel-steering vehicle 1. Hydraulic system 2 includes first cylinder 10 and second cylinder 20. When incorporated in a vehicle such as four-wheel-steering vehicle 1, for example, one of the cylinders 10, 20 would control the steering of the front wheels of vehicle 1, while the other of cylinders 10, 20 could control the steering of the rear wheels. Extension of each of cylinders 10, 20 could correspond to turning the respective vehicle wheels to the left or to the right, in various embodiments, while retraction of the same cylinder would correspond to turning the vehicle wheels in the opposite direction. Because the rear wheels should turn complementarily to the front wheels, this means one of cylinders 10, 20 should always retract when the other extends and vice versa.

While cylinders 10 and 20 as depicted in FIG. 2 are single-rod cylinders, double-rod cylinders are used in alternative embodiments. In that case, extension in a first direction of each of the cylinders could correspond to turning the respective vehicle wheels to the left or to the right, in various embodiments, while extension in the second, opposing direction of the same cylinder would correspond to turning the vehicle wheels in the opposite direction. It is understood that for both extension and retraction of a piston in a single-rod cylinder, and extension in either direction in a double-rod cylinder, the extension and/or retraction have maximal positions at either end of the cylinder, in which case the piston occupies a full stroke position at that cylinder end.

It is also desireable for the two cylinders 10 and 20 to remain synchronized, so that as one of the cylinders 10 and 20 reaches an extended full stroke position, the other simultaneously reaches a retracted full stroke position, and vice versa. The illustrative embodiment of hydraulic system 2 effectively achieves this desireable characteristic and maintains synchronization between the cylinders 10 and 20, such as by cross-porting the cylinders at the full stroke positions, and as further described herein.

First cylinder 10 includes piston 16, first end 12, and second end 14. Conduit 32 is fluidly coupled to first end 12, and conduit 34 is fluidly coupled to second end 14. Piston rod 18 is coupled to piston 16 and extends through first end 12. Piston 16 is depicted occupying a full stroke position at first end 12. As depicted in dashed lines, piston 16b may also occupy a full stroke position at second end 14.

Similarly, second cylinder 20 includes piston 26, first end 22, and second end 24. First ends 12 and 22 and second ends 14 and 24 thereby define four cylinder ends among the two cylinders 10 and 20. Piston rod 28 is coupled to piston 24 and sealingly extends through a wall at first end 22. Piston 26 is depicted occupying a full stroke position at second end 24. As depicted in dashed lines, piston 26 may also occupy a full stroke position at first end 22, as depicted in dashed lines at 26b. Piston 26 moves from second end 24 to first end 22 as piston 16 moves from first end 12 to second end 14. Conduit 36 is fluidly coupled to first end 22, while conduit 38 is fluidly coupled to second end 24.

First cylinder 10 and second cylinder 20 are fluidly coupled to each other via first end 12 of first cylinder 10 and first end 22 of second cylinder 20. Conduit 32 and conduit 36 comprise the fluid coupling between first cylinder 10 and second cylinder 20. First ends 12 and 22 are a matched pair of cylinder ends—that is, they are both first ends of their respective cylinders. Second ends 14 and 24 similarly form a matched pair of cylinder ends. Although first and second cylinders 10 and 20 are coupled to each other via the matched pair of first ends 12 and 22 in the embodiment of FIG. 2, they may also be fluidly coupled to each other via the matched pair of second ends in other embodiments, for example. Either way, the cylinders will operate such that when one cylinder is being retracted, the other cylinder is being extended.

In the embodiment of FIG. 2, hydraulic system 2 includes a steering control unit 30, which has an input connected to a source of fluid power, such as pump 60. Steering control unit 30 also has controlled output ports fluidly coupled to first and second cylinders 10 and 20 via second ends 14 and 24, respectively, constituting the other matched pair of cylinder ends that are not included in the conduits for fluidly coupling the cylinders 10 and 20 to each other. In this illustrative embodiment, steering control unit 30 can be caused to transmit flow via conduit 34 to the second end 14 of first cylinder 10 to cause the vehicle 1 to steer left, or to transmit flow via conduit 38 to the second end 24 of second cylinder 20 to cause the vehicle to steer right. In other embodiments, the opposite arrangement or other arrangements for left and right steering may be the case. For example, which direction vehicle 1 steers when either cylinder 10 or 20 is extended or retracted depends on a variety of steering geometry factors including steering linkage, travel direction, and whether inboard or outboard steering is used, for example.

In one example of this embodiment, the first cylinder 10 controls the front wheels of vehicle 1 and the second cylinder 20 controls the rear wheels of vehicle 1. In other embodiments, either cylinder might govern either the front or rear wheels, or something besides wheels, such as treads, for example. In this particular embodiment, as an illustrative example, in each of cylinders 10 and 20, extension of the cylinder turns the wheels to the left, and retraction of the cylinder turns the wheels to the right. The vehicle 1 will then steer to the left when the front wheels are turned left and the rear wheels are turned right, corresponding to the first cylinder being extended and the second cylinder being retracted. Similarly, the vehicle 1 will steer to the right when the front wheels are turned right and the rear wheels are turned left, as depicted in the configuration of FIG. 1, corresponding to the first cylinder 10 being retracted and the second cylinder 20 being extended. As stated, other steering conventions are contemplated for other embodiments.

The fluid coupling between the first ends 12 and 22 are configured so that when pressurized fluid is sent from steering control unit 30 into second end 14 of first cylinder 10, causing cylinder 10 to extend, piston 16 also causes a flow from first end 12 of first cylinder 10 to first end 22 of second cylinder 20, retracting the rod of second cylinder 20. So, the single fluid flow from steering control unit 30 through conduit 34 causes a coordinated action of both cylinders 10, 20 to steer the vehicle 1 to the left. Similarly, when pressurized fluid is sent from steering control unit 30 into second end 24 of second cylinder 20, causing cylinder 20 to extend, piston 26 also causes a flow from first end 22 of second cylinder 20, through the fluid coupling between the first ends 12 and 22 including conduits 36 and 32, to first end 12 of first cylinder 10, retracting the rod of first cylinder 10. The single fluid flow from steering control unit 30 through conduit 38 thereby causes a coordinated action of both cylinders 10, 20 to steer the vehicle 1 to the right, in this embodiment.

Hydraulic system 2 also includes first check valve 40 and second check valve 42, coupled to conduits 32 and 34, respectively, according to the embodiment of FIG. 2. Check valves 40 and 42 are illustrative types of bypasses, or bypass devices. Other types of bypasses or bypass devices performing similar functions are contemplated for alternative embodiments. Such other types of bypasses include sliding seals, spring-loaded check valves, and relief valves, for example, among yet other compatible options.

First check valve 40 is fluidly coupled on one side to first cylinder 10, between first end 12 and second end 14 but near first end 12. On the other side, first check valve 40 is fluidly coupled to conduit 32. First end 12 of first cylinder 10 may be defined as a first bypass end among the various cylinder ends, because it hosts a bypass device, i.e. first check valve 40. First check valve 40 permits a one-way flow from the side coupled to first cylinder 10 to the side coupled to conduit 32, when pressure in cylinder 10 is greater than in conduit 32. When cylinder 10 is fully retracted, i.e. when piston 16 occupies the full stroke position at second end 14 as depicted at 16b, or when cylinder 10 is in an intermediate stage of extension or retraction, there is no anticipated pressure differential across first check valve 40. However, when a flow into cylinder 10 via conduit 34 drives cylinder 10 to full extension, such that piston 16 occupies the full stroke position at first end 12, then a greater pressure is exerted on the cylinder side of first check valve 40 than on the conduit side thereof. First check valve 40 is thereby configured so that when piston 16 occupies the full stroke position at the first end 12 of first cylinder 10, and a pressure differential exists with greater pressure in cylinder 10, first check valve 40 opens an outlet that allows a flow from first cylinder 10 to conduit 32. The required pressure differential across check valve 40 to cause check valve 40 to open may vary in different embodiments, from negligible to any magnitude.

This bypass effect opens a flow that is otherwise not open from conduit 34 to conduits 32 and 36. If cylinders 10 and 20 have become desynchronized such that piston 26 of cylinder 20 has begun to lag behind piston 16 of cylinder 10 and become biased toward the first end 22 thereof, so that piston 26 has not yet reached the full stroke position at second end 24 of second cylinder 20 when piston 14 has already reached the full stroke position at first end 12 of first cylinder 10, the effect of bypassing first cylinder 10 acts to correct this desynchronization. In such a case, when cylinder 10 becomes fully extended such that piston 16 occupies the full stroke position at first end 12 of first cylinder 10, cylinder 20 would still not be fully retracted, without the bypass action of the first check valve 40. However, first check valve 40 allows a flow from second end 14 of first cylinder 10 to first end 22 of second second cylinder 20, via conduits 32 and 36, when piston 16 occupies the full stroke position at the first end 12 of first cylinder 10. This in turn allows a flow through conduit 34 into first cylinder 10 to pass through conduits 32 and 36 into second cylinder 20 and to move piston 26 until it occupies the full stroke position at second end 24 of second cylinder 20, as depicted in FIG. 2, in synchronization with the full stroke position of piston 16 at first end 12. First check valve 40 thereby restores synchronization between first cylinder 10 and second cylinder 20.

Similarly, second check valve 42 is fluidly coupled on one side to first cylinder 10, between first end 12 and second end 14 but near second end 14. The other side of second check valve 42 is fluidly coupled to conduit 34. Second end 14 of first cylinder 10 may be considered a second bypass end among the various cylinder ends, because it hosts another bypass device, i.e. second check valve 42. Second check valve 42 permits a one-way flow from the side thereof coupled to first cylinder 10 to the side coupled to conduit 34, when pressure is greater in cylinder 10 than in conduit 34. When cylinder 10 is fully extended, i.e. when piston 16 occupies the full stroke position at first end 12, or when cylinder 10 is in an intermediate stage of extension or retraction, there is no anticipated pressure differential across second check valve 42. However, when a flow into cylinder 10 via conduit 32 drives piston 16 of cylinder 10 to full retraction, such that piston 16 occupies the full stroke position at second end 14, then a greater pressure is exerted on the cylinder side of second check valve 42 than on the conduit side thereof. Second check valve 42 is configured so that when piston 16 occupies the full stroke position at the second end 14 of first cylinder 10, and there is greater pressure in cylinder 10 than in conduit 34, second check valve 42 opens an outlet that allows a flow from first cylinder 10 to bypass to conduit 34.

This bypass effect opens a flow that is otherwise not open from conduit 32 to conduit 34. If cylinders 10 and 20 have become desynchronized such that cylinder 20 has begun to lag behind cylinder 10 and become biased toward the second end 24 thereof, so that piston 26 has not yet reached the full stroke position at first end 22 of second cylinder 20 when piston 14 has already reached the full stroke position at second end 14 of first cylinder 10, the effect of bypassing first cylinder 10 may act to correct this desynchronization. Prior to synchronization, when cylinder 10 becomes fully retracted such that piston 16 occupies the full stroke position at second end 14 of first cylinder 10, cylinder 20 would still not be fully extended, without the bypass action of the second check valve 42. However, second check valve 42 allows a flow from second end 14 of first cylinder 10 to bypass to second end 24 of second second cylinder 20, via conduits 34 and 38, when piston 16 occupies the full stroke position at the second end 14 of first cylinder 10. This in turn allows a flow through conduit 32 into first cylinder 10 to pass through conduits 34 and 38 into second cylinder 20 and further pressure piston 26 until it occupies the full stroke position at first end 22 of second cylinder 20. Second check valve 42 thereby restores synchronization between first cylinder 10 and second cylinder 20 in this situation, analogously to the effects of first check valve 40 as described above.

While FIG. 2 depicts a fluid system according to one embodiment, a variety of other arrangements of components occur in other embodiments, such as with bypass devices that are or include relief valves, sliding seals, or check valves internal to the pistons, rather than exterior check valves, for example; or with cylinders that are double-rod rather than single-rod, for example. Some additional illustrative embodiments are depicted in FIGS. 3-6, and described below.

Figure 3:
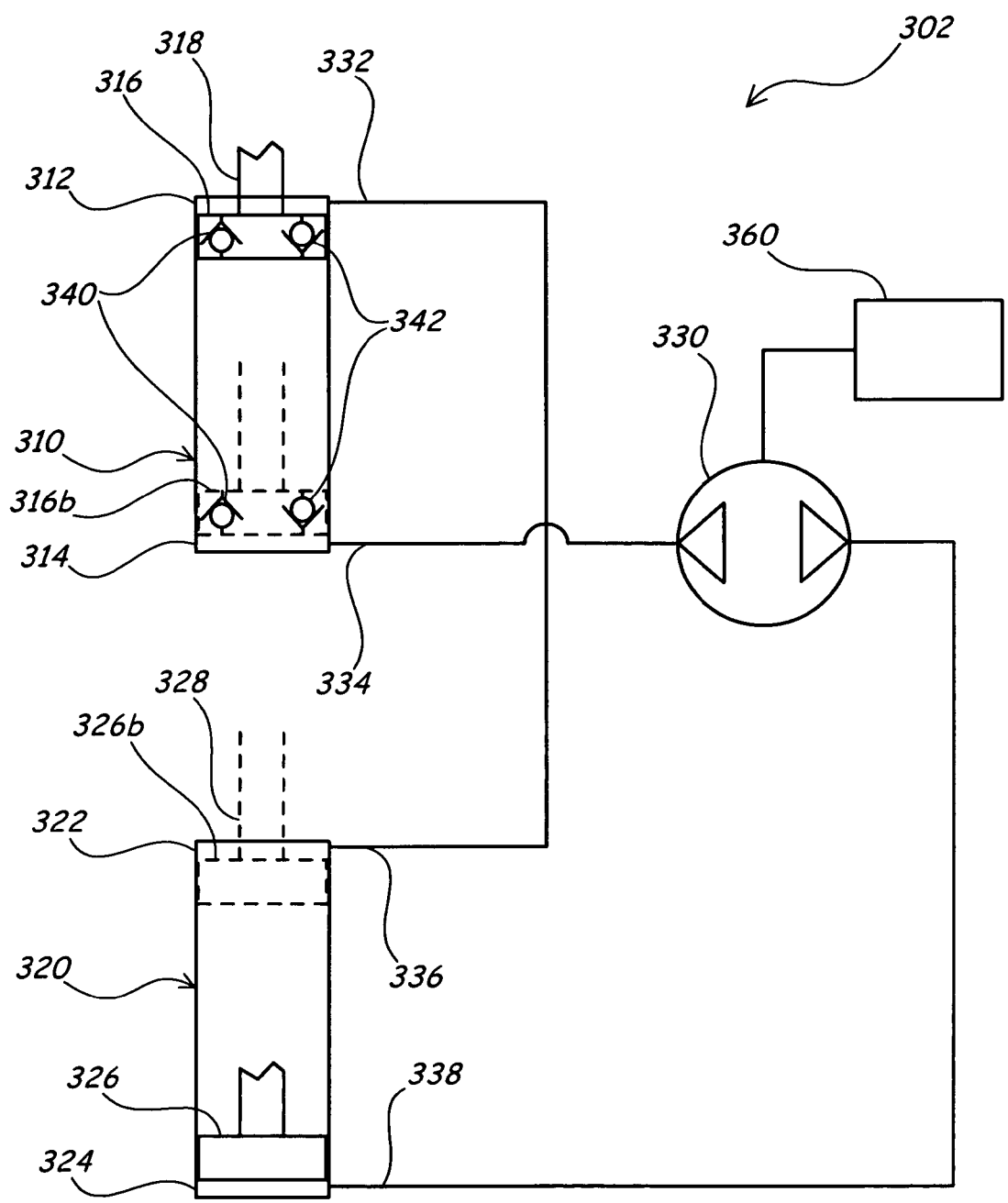
FIG. 3 is a schematic depiction of a hydraulic system according to a third embodiment of the present invention.

FIG. 3 depicts a hydraulic system 302 of the present invention, in another illustrative embodiment of a fluid system that could usefully be incorporated in four-wheel-steering vehicle 1 and other applications. Hydraulic system 302 includes first cylinder 310, second cylinder 320, steering control unit 330, and pump 360. Hydraulic system 302 is analogous in some respects to hydraulic system 2 of FIG. 2, and is configured to maintain synchronization between the cylinders 310 and 320, although it is particularly different in its inclusion of piston 316, which includes both a first bypass 340 for allowing a flow from the first end 312 to the second end 314, and a second bypass 342 for allowing a flow from the second end 314 to the first end 312. Piston 316 can be considered a bypass device that comprises component bypasses 340 and 342, and first and second ends 312 and 314 can be considered bypass ends because they host the function of their respective bypass devices.

First cylinder 310 includes piston 316, first end 312, and second end 314. Conduit 332 is fluidly coupled to first end 312, and conduit 334 is fluidly coupled to second end 314. Piston rod 318 is coupled to piston 316 and sealingly extends through a wall at first end 312. Piston 316 is depicted occupying a full stroke position at first end 312. As depicted in dashed lines at 316b, piston 316 may also occupy a full stroke position at second end 314.

Similarly, second cylinder 320 includes piston 326, first end 322, and second end 324. First ends 312 and 322 and second ends 314 and 324 thereby define four cylinder ends among the two cylinders 310 and 320. Piston 326 is depicted occupying a full stroke position at second end 324, and alternately at 326b occupying a full stroke position at first end 322. Piston rod 328 and conduits 336 and 338 are disposed similarly to analogous components of FIG. 2.

First cylinder 310 and second cylinder 320 are fluidly coupled to each other via first end 312 of first cylinder 310 and first end 322 of second cylinder 320. Conduit 332 and conduit 336 comprise this fluid coupling between first cylinder 310 and second cylinder 320. First ends 312 and 322 are a matched pair of cylinder ends—that is, they are both first ends of their respective cylinders. Second ends 314 and 324 similarly form a matched pair of cylinder ends. First and second cylinders 310 and 320 may also be fluidly coupled to each other via the matched pair of second ends, for example. Either way, the cylinders will operate such that when one cylinder is being retracted, another cylinder is being extended.

Bypass devices 340 and 342 comprise another illustrative bypass embodiment. Bypass 340 is disposed in piston 316, and is configured so that when piston 316 occupies a full stroke position at second end 314, and at least a threshold of pressure differential is able to accumulate inside cylinder 310 relative to conduit 334, bypass device 340 opens an outlet that allows a one-way flow from inside cylinder 310 to conduit 334. Similarly, bypass 342 is disposed in piston 316 so that when piston 316 occupies a full stroke position at first end 312, and at least a threshold of pressure differential is able to accumulate inside cylinder 310 relative to conduit 332, bypass device 342 opens an outlet that allows a one-way flow from inside cylinder 310 to conduit 332. When piston 316 is between full stroke positions, bypass devices 340 and 342 remain sealed, allowing for the efficient control of piston 316 responsively to fluid inflows from conduits 332 and 334.

The effect of bypass devices 340 and 342 is therefore to open a flow that is otherwise not open, both from conduit 334 to conduit 332 when piston 316 is in a full stroke position at first end 312, and from conduit 332 to conduit 334 when piston 316 is in a full stroke position at second end 314. This allows a flow of pressurized fluid through to cylinder 320 to continue to drive piston 326 to its respective complementary full stroke position if it is not already there. That is, a bypass flow is allowed through to second end 324 when piston 316 occupies the full stroke position at second end 314, and to first end 322 when piston 316 occupies occupies the full stroke position at first end 312. Piston 316, comprising bypass devices 340 and 342, thereby restores synchronization between first cylinder 310 and second cylinder 320.

Although FIG. 3 particularly depicts check valves comprised in piston 316, a variety of other mechanisms are contemplated wherein the piston comprises bypasses within the scope of the claimed invention. As another example thereof, the piston comprises a sliding seal in one embodiment, wherein the sliding seal performs the equivalent function of opening an outlet that allows a one-way flow from the cylinder to bypass the piston to a conduit coupled to the corresponding end, when the first piston occupies the full stroke position corresponding to that end.

Figure 4:
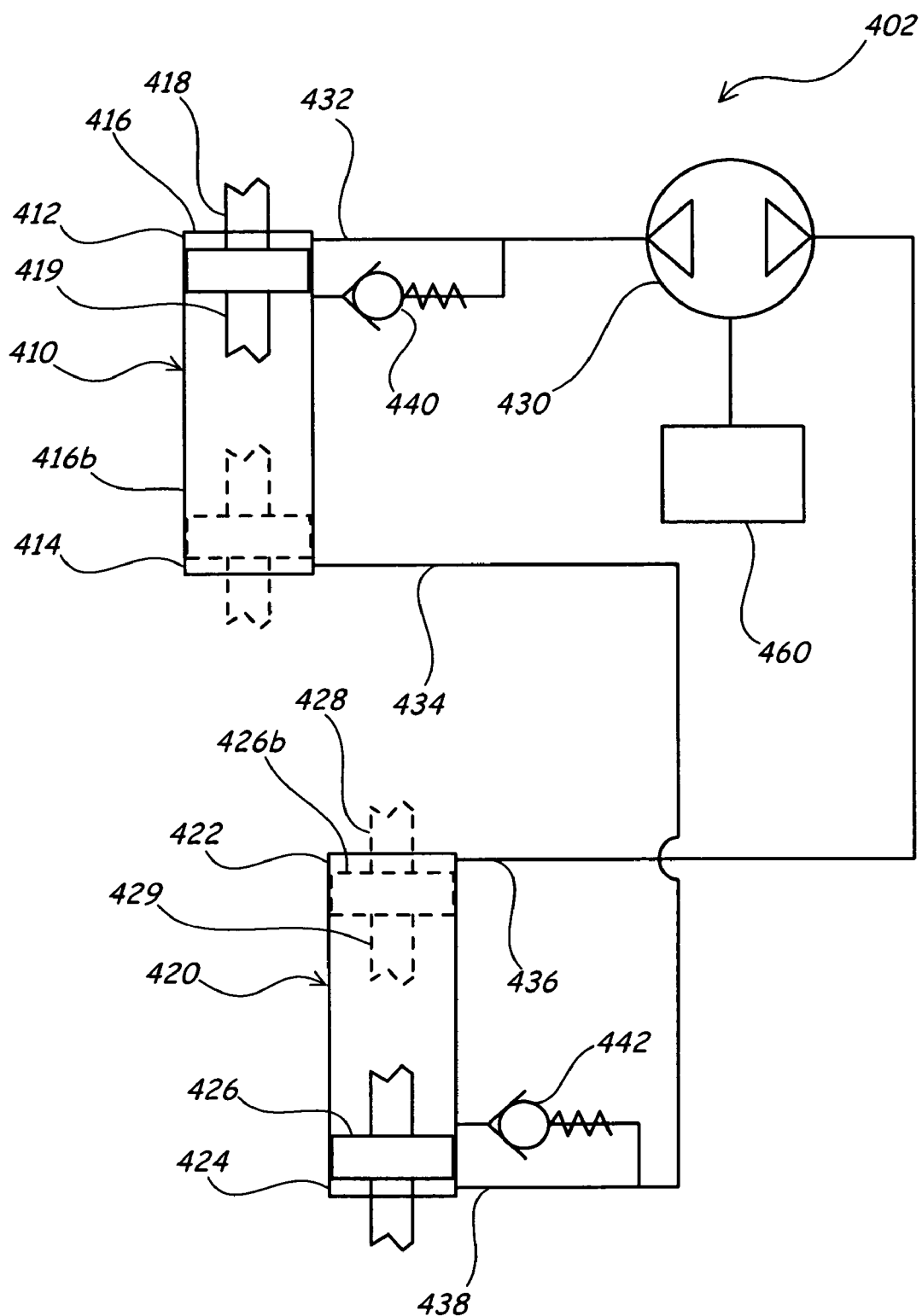
FIG. 4 is a schematic depiction of a hydraulic system according to a fourth embodiment of the present invention.

FIG. 4 depicts a hydraulic system 402 of the present invention, in yet another illustrative embodiment of a fluid system that could usefully be incorporated in four-wheel-steering vehicle 1 or other applications. Hydraulic system 402 includes first cylinder 410, second cylinder 420, steering control unit 430, and pump 460. Hydraulic system 402 is analogous in some respects to hydraulic systems 2 and 302 of FIGS. 2 and 3, above, and is configured to maintain synchronization, as well as pressure balance, between the cylinders 410 and 420. First and second cylinders 410 and 420 are double-rod steering cylinders, which are encompassed within the embodiments of the present invention.

First cylinder 410 includes piston 416, first rod 418, second rod 419, first end 412, and second end 414. Conduit 432 is fluidly coupled to first end 412 and to steering control unit 430, and conduit 434 is fluidly coupled to second end 414 and to conduit 438 leading to second end 424 of second piston 420. First rod 418 is coupled to piston 416 and sealingly extends through a wall at first end 412. Second rod 419 is coupled to piston 416 on the opposing face from first piston rod 418, and sealingly extends through the opposing wall at second end 414. Piston 416 is depicted occupying a full stroke position at first end 412. As depicted in dashed lines at 416b, piston 416 may also occupy a full stroke position at second end 414. With double-rod cylinders, the full stroke positions do not correspond to the cylinders being retracted and extended; rather, they correspond to the cylinders being extended in a first direction and extended in the opposing direction.

Second cylinder 420 includes piston 426, first rod 428, second rod 429, first end 422, and second end 424. First ends 412 and 422 and second ends 414 and 424 thereby define four cylinder ends among the two cylinders 410 and 420. Piston 426 is depicted occupying a full stroke position at second end 424, and alternately in dashed lines at 426b occupying a full stroke position at first end 422. First rod 428 is coupled to piston 426 and sealingly extends through a wall at first end 422. Second rod 429 is coupled to piston 426 on the opposing face from first piston rod 428, and sealingly extends through the opposing wall at second end 424. Conduit 436 leads from first end 422 to steering control unit 430, and conduit 438, as mentioned above, leads from second end 424 to conduit 434 out of second end 414.

First cylinder 410 and second cylinder 420 are fluidly coupled to each other via second end 414 of first cylinder 410 and second end 424 of second cylinder 420. Conduit 434 and conduit 438 comprise this fluid coupling between first cylinder 410 and second cylinder 420. Second ends 414 and 424 are a matched pair of cylinder ends, and first ends 412 and 422 similarly form a matched pair of cylinder ends.

First check valve 440 is spring-loaded for an enhanced opening pressure threshold. First check valve 440 is fluidly coupled on one side to first cylinder 410, between first end 412 and second end 414 but near first end 412, which thereby functions as a bypass end. On the other side, first check valve 440 is fluidly coupled to conduit 432. First check valve 440 permits a one-way flow from the side coupled to first cylinder 410 to the side coupled to conduit 432, when the pressure differential between cylinder 410 and conduit 432 exceeds the threshold of spring-loaded first check valve 440. First check valve 440 is configured somewhat analogously to check valve 40 of FIG. 2, above, so that when piston 416 occupies the full stroke position at the first end 412 of first cylinder 410, and there is a pressure differential with a greater pressure in cylinder 410 than in conduit 432, first check valve 440 opens an outlet that allows a flow from first cylinder 410 to bypass piston 416 to conduit 432, providing analogous capability to synchronize the cylinders 410 and 420.

Second spring-loaded check valve 442 is configured somewhat differently in hydraulic system 402 than in the systems of FIGS. 2 and 3 in that it is connected to second cylinder 420, providing for one check valve associated with each of two cylinders, illustrating aspects of another embodiment. Second check valve 442 is fluidly coupled on one side to second cylinder 420 near second end 424, and on the other side to conduit 438. Second check valve permits a one-way flow from second cylinder 420 to conduit 438 when there is a sufficient pressure differential between cylinder 420 and conduit 438, and piston 426 occupies the full stroke position at second end 424, which thereby functions as a second bypass end among the various cylinder ends. Second check valve 442 is thereby configured somewhat similarly to second check valve 42 of FIG. 2, above, except that it is disposed on a different cylinder than first check valve 440.

The combined effect of bypass devices 440 and 442 is therefore to open a flow path from conduit 434 to conduit 432 when piston 416 of first cylinder 410 is in a full stroke position at first end 412, and to open a flow path from conduit 436 to conduit 438 when piston 426 of second cylinder 420 is in a full stroke position at second end 424. Bypass devices 440 and 442, somewhat analogously to the bypass devices described above, thereby restore synchronization between first cylinder 410 and second cylinder 420.

FIG. 4 also illustrates the advantages of a pressure balance feature of this embodiment. Without a pressure balance feature, a device similar to system 402, having one check valve associated with each of two cylinders, would have potential for what may be an undesirable effect, that of flow continuing to pass through check valves 440 and 442 when both cylinders 410, 420 have already reached their full stroke positions. This could happen when flow is directed from steering control unit 430 through conduit 436 into cylinder 420, piston 426 is in the full stroke position at first end 412, while piston 416 is in the full stroke position at second end 424, and flow continues through check valve 442, cylinder 410, and check valve 440, ultimately to the opposing port on steering control unit 430.

This could allow the operating pressure between the two ports of the steering control unit 430 to become unbalanced.

However, this effect is prevented in the present embodiment, wherein check valves 440 and 442 are spring-loaded check valves, or take some other form which similarly equips them with combined opening pressures that add up to a greater sum than the operating pressure of the hydraulic system 402. The opening pressures of check valves 440 and 442 are the pressure thresholds below which check valves 440 and 442 remain closed. The cumulative opening pressures can assure pressure balance because the check valves 440, 442 are disposed in series. For example, check valves 440 and 442 might each have a preselected opening pressure of 900 pounds per square inch (p.s.i.), while the operating pressure of hydraulic system 402 may be 1200 p.s.i. Because the opening pressure of a single one of check valves 440, 442 is significantly less than the operating pressure of the system 402, one check valve at a time may open under the right conditions, e.g. when a full stroke position is occupied at the cylinder end corresponding to that check valve by the corresponding piston. However, there will be insufficient pressure downstream of the open check valve to match the opening pressure of the second check valve. This would be the case for flow downstream of check valve 442 that reached check valve 440, which would not suffice to open check valve 440. These check valves thereby assure the pressure balance of hydraulic system 402. Such a pressure balance feature is contemplated in various embodiments within the scope of the present invention.

Figure 5:
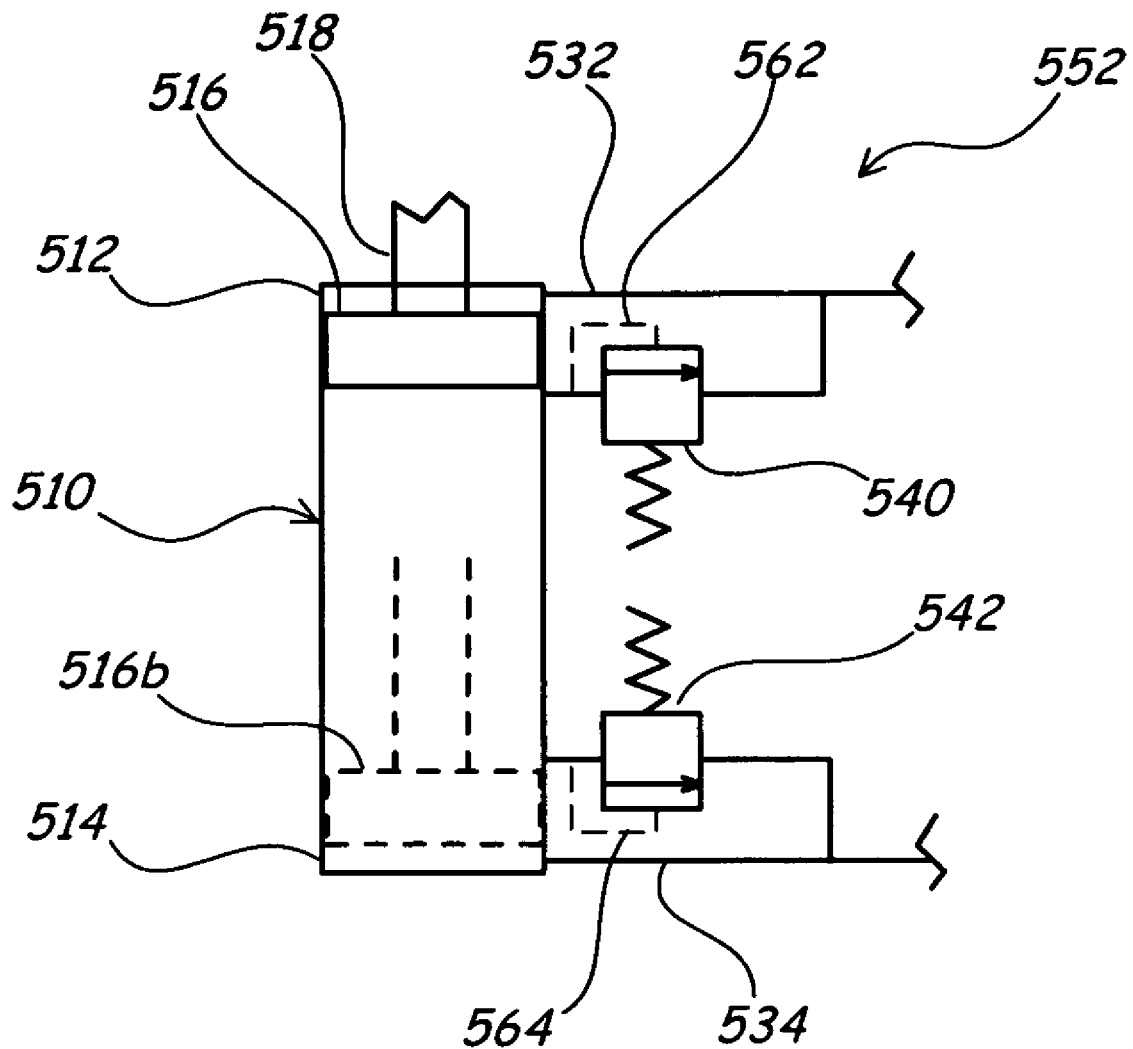
FIG. 5 is a schematic depiction of a component of a hydraulic system according to a fifth embodiment of the present invention.

FIG. 5 depicts a component 552 of a hydraulic system of the present invention, in yet another illustrative embodiment of a fluid system that could usefully be incorporated in four-wheel-steering vehicle 1 or other applications. Component 552 is analogous in some respects to components of hydraulic systems described above, and includes first cylinder 510 and conduits 532 and 534 that are connectable to other components, including cylinders, conduits, and steering control units, for example. Component 552 is configured to maintain synchronization between the cylinder 510 and at least one other cylinder to which it is coupled in a hydraulic system.

Cylinder 510 includes piston 516, piston rod 518, first end 512, and second end 514. Piston 516 is depicted occupying a full stroke position at first end 512, and may also occupy a full stroke position at second end 514, as depicted in dashed lines at 516b.

Component 552 also includes first relief valve 540, fluidly coupled to cylinder 510 near first end 512 and to conduit 532; and second relief valve 542, fluidly coupled to cylinder 510 near second end 514 and to conduit 534. Relief valves 542 and 544 operate similarly in some ways to check valves and other bypass devices described above. Relief valves 542 and 544 are each configured so that when a full stroke position is occupied by piston 516 at the respective cylinder bypass ends, namely first end 512 and second end 514, and a threshold differential is surpassed as fed through the respective pilot lines 562, 564 of the relief valves, the respective relief valves 542 and 544 each open an internal outlet, passage or conduit that allows a flow from cylinder 510 to conduits 532 and 534, respectively. Relief valves 542 and 544 may provide unique advantages in some applications. For example, relief valves 542 and 544 may be variable, so that the minimum threshold of differential pressure across them that opens the internal outlet passage, and therefore the sensitivity with which component 552 synchronizes with a companion cylinder, may be optimized.

Although the present invention has been described with reference to some particular preferred embodiments, workers skilled in the art will recognize that changes may be made in form and detail without departing from the spirit and scope of the invention. For example, different features described with reference to individual embodiments may be mixed and matched in any permutation in additional embodiments within the scope of the claimed invention. As another example, aspects described in terms of "fluid" or "hydraulic" may be understood to be configurable in other, comparable technologies, such as pneumatic systems. As another example, the term "comprising" is understood as a term of art in patent claims, e.g. to indicate inclusion without implying exclusion of additional components. As a further example, while certain embodiments are described and depicted herein wherein two bypass devices are situated at two particular cylinder ends from among the four cylinder ends, the bypass devices may be situated at any pair of the four cylinder ends in other embodiments, or at any three or all four cylinder ends. Additional cylinders beyond the two depicted herein may also occur in other embodiments, potentially including additional bypass devices used with cylinder ends of the additional cylinders. Other embodiments will be appreciated by those in the art to be apparent or implied from the specification and figures and to lie within the metes and bounds of the claims herein.

What is claimed is:

1. A fluid system comprising:
a first cylinder defining a compression end and an extension end and including a first piston;
a second cylinder defining a compression end and an extension end and including a second piston, the compression ends of the first cylinder and the second cylinder defining a first pair of cylinder ends and the extension ends of the first cylinder and the second cylinder defining a second pair of cylinder ends, the second cylinder fluidly coupled to the first cylinder via one of the first pair of cylinder ends and the second pair of cylinder ends;
a bypass defining an outlet coupled to a conduit, the bypass configured to allow fluid to bypass the piston of one of the first cylinder and the second cylinder from the corresponding cylinder into the conduit when the associated piston is positioned adjacent one of the compression end and the extension end of the corresponding cylinder; and
a steering control unit fluidly coupled to the first cylinder and the second cylinder.

2. The fluid system of claim 1, wherein the bypass is a first bypass, and wherein the fluid system further includes a second bypass defining an outlet coupled to a conduit, the second bypass configured to allow fluid to bypass the piston of one of the first cylinder and the second cylinder into the conduit when the associated piston is positioned adjacent one of the compression end and the extension end of the corresponding cylinder.

3. The fluid system of claim 2, wherein the first bypass is positioned adjacent the compression end of the first cylinder, and the second bypass is positioned adjacent the extension end of the first cylinder.

4. The fluid system of claim 2, wherein the first bypass is positioned adjacent the compression end of the first cylinder, and the second bypass is positioned adjacent the extension end of the second cylinder.

5. The fluid system of claim 2, wherein at least one of the first bypass and the second bypass includes a check valve.

6. The fluid system of claim 2, wherein at least one of the first bypass and the second bypass includes a relief valve.

7. The fluid system of claim 2, wherein the first piston includes the first bypass and the second bypass, wherein the first bypass is configured to permit flow through the first piston to the conduit coupled to the first bypass when the first piston is positioned adjacent one of the compression end and the extension end, and wherein the second bypass is configured to permit flow through the first piston to the conduit coupled to the second bypass when the first piston is positioned adjacent the other of the compression end and the extension end.

8. The fluid system of claim 2, wherein each of the first bypass and the second bypass include a preselected opening pressure, and wherein a sum of the preselected opening pressures of the first bypass and the second bypass is greater than an operating pressure of the fluid system.

9. The fluid system of claim 1, wherein the second cylinder is fluidly coupled to the first cylinder via the first pair of cylinder ends, and wherein the steering control unit is fluidly coupled to the first cylinder and the second cylinder via the second pair of cylinder ends.

10. The fluid system of claim 1, wherein the second cylinder is fluidly coupled to the first cylinder via the second pair of cylinder ends, and wherein the steering control unit is fluidly coupled to the first and second cylinder via the first pair of cylinder ends.

11. The fluid system of claim 1, wherein the associated piston includes the bypass.

12. The fluid system of claim 1, wherein the first cylinder is coupled to a front pair of wheels of a wheeled vehicle and the second cylinder is coupled to a back pair of wheels of the wheeled vehicle, and wherein the first cylinder is configured to control the steering of the front pair of wheels and the second cylinder is configured to control the steering of the back pair of wheels.

13. A fluid system comprising:
a first cylinder defining a first end and a second end and including a first piston, each of the first end and the second end defining a full stroke position of the first piston, the first piston initially positioned adjacent the first end of the first cylinder;
a second cylinder defining a first end and a second end and including a second piston, each of the first end and the second end of the second cylinder defining a full stroke position of the second piston, the second piston initially positioned adjacent the second end of the second cylinder, the second end of the first cylinder fluidly coupled to the second end of the second cylinder such that the second piston is movable in a direction opposite a direction that the first piston is movable, wherein one of the first cylinder and the second cylinder is coupled to front wheels of a wheeled vehicle to control steering of the front wheels, and wherein the other of the first cylinder and the second cylinder is coupled to back wheels of the wheeled vehicle to control the steering of the back wheels;
a first bypass device in communication with the first cylinder and defining an outlet coupled to a conduit, the first bypass device configured to bypass the first piston to allow unidirectional flow from the first cylinder when the first piston is positioned adjacent the first end of the first cylinder; and
a second bypass device in communication with one of the first cylinder and the second cylinder and defining an outlet coupled to a conduit, the second bypass device configured to bypass the associated piston to allow a unidirectional flow from the corresponding cylinder when the piston of the corresponding cylinder is positioned adjacent one of the second end of the first cylinder, the first end of the second cylinder, and the second end of the second cylinder.

14. The fluid system of claim 13, further comprising a steering control unit fluidly coupled to the first end of the first cylinder and the first end of the second cylinder.

15. The fluid system of claim 14, wherein, when the first piston is moved toward the full stroke position defined by the second end of the first cylinder, the second piston is moved toward the full stroke position defined by the first end of the second cylinder.

16. The fluid system of claim 13, wherein at least one of the first bypass device and the second bypass device includes a check valve.

17. The fluid system of claim 13, wherein the first piston includes the first bypass device and the second bypass device, and wherein the second bypass device is configured to allow a unidirectional flow from the first cylinder when the first piston is positioned adjacent the second end of the first cylinder.

18. The fluid system of claim 13, wherein the second bypass device is in communication with the second cylinder to bypass the second piston and to allow a unidirectional flow from the second cylinder when the second piston is positioned adjacent the second end of the second cylinder.

19. A vehicle comprising:
a first wheel and a second wheel;
a first cylinder defining a compression end and an extension end and including a first piston, the first cylinder in communication with the first wheel to control steering of the first wheel;
a second cylinder defining a compression end and an extension end and including a second piston, the second cylinder in communication with the second wheel to control steering of the second wheel, the compression ends of the first cylinder and the second cylinder defining a first pair of cylinder ends and the extension ends of the first cylinder and the second cylinder defining a second pair of cylinder ends such that the second cylinder is fluidly coupled to the first cylinder via one of the first pair of cylinder ends and the second pair of cylinder ends;
a steering control unit fluidly coupled to the first cylinder and the second cylinder and configured to enable steering of the first wheel and the second wheel;
a first bypass device in communication with one of the first cylinder and the second cylinder and defining an outlet coupled to a conduit, the first bypass device configured to allow fluid to bypass the associated piston from the corresponding cylinder into the conduit when the associated piston is positioned adjacent one of the compression ends and extension ends of the first cylinder and the second cylinder; and
a second bypass device in communication with one of the first cylinder and the second cylinder and defining an outlet coupled to a conduit, the second bypass device configured to allow fluid to bypass the associated piston from the corresponding cylinder into the conduit when the associated piston is positioned adjacent another of the compression ends and extension ends of the first cylinder and the second cylinder.

20. The vehicle of claim 19, wherein at least one of the first bypass device and the second bypass device includes a check valve.

21. The vehicle of claim 19, wherein the corresponding piston includes at least one of the first bypass device and the second bypass device.

* * * * *